UNITED STATES PATENT OFFICE.

JOHN CADMAN, OF EDGBASTON, ENGLAND.

ABSORBENT MEDIUM FOR CARBONIC-ACID GAS.

1,207,273.   Specification of Letters Patent.   Patented Dec. 5, 1916.

No Drawing.   Application filed July 17, 1914.   Serial No. 851,667.

*To all whom it may concern:*

Be it known that I, JOHN CADMAN, D. Sc., a subject of the King of Great Britain, residing at 61 Wellington road, Edgbaston, Warwickshire, England, have invented a new and useful Improved Absorbent Medium for Carbonic-Acid Gas, of which the following is a specification.

This invention relates to improvements in media for the elimination or absorption of carbonic acid gas from air, and it is particularly designed for use in connection with breathing apparatus used by persons working in irrespirable atmospheres or under water and in which the wearer rebreathes his exhaled breath after it has been purified of the carbonic acid gas which it contains. It has hitherto been the practice to make use for this purpose of lumps, sticks or granules of caustic soda, soda lime or caustic potash, over the surface of which the impure air is passed, and it has been found that air so freed of its carbonic acid content becomes unpleasantly hot. Attempts have been made to remedy this defect by the employment of a cooling device through which the purified air is caused to pass before being rebreathed.

Now, my invention has for its object to provide an improved form of purifying medium for the elimination of carbonic acid gas from air and to this end I proceed as follows:—that is to say, in lieu of employing solid lumps or the equivalent of the absorbent substance such as caustic soda, I employ the said substance in the form of a thin layer or skin upon a porous vehicle such as coke, charcoal or any other porous substance having a high specific heat.

In practice I prefer to employ small lumps of coke which are immersed in melted caustic soda, caustic potash, soda lime or the like, and allowed to remain therein while the latter is kept in motion until a layer film or skin of the alkali has solidified over the surfaces of the lumps.

Impure air passed over an absorbent medium as above described is purified by the elimination of the carbonic acid gas it contains without being unduly heated. As a further safeguard against the heating of the air, however, I may add to the carbonic acid absorbent a suitable cooling material such as calcium chlorid.

Claims:

1. A regenerative medium comprising a vehicle consisting of a porous substance such as coke, charcoal or the like, having an exterior and interior coating, film or skin of a carbonic acid gas absorbent.

2. An absorbent for carbonic acid gas, which consists of a porous vehicle having its entire surface exteriorly and interiorly covered by a coating or film of caustic soda.

3. An absorbent for carbonic acid gas, comprising a vehicle consisting of a porous substance such as coke, charcoal or the like, having an exterior and interior coating, film or skin of an absorbent material, to which has been added a substance having greater affinity for moisture and less heat of solution than the absorbent material.

4. An absorbent for carbonic acid gas, comprising a vehicle which consists of a porous substance, having exteriorly and interiorly a coating of a carbonic acid gas absorbent, to which has been added calcium chlorid.

JOHN CADMAN.

Witnesses:
 JOHN F. SIMONS,
 MURAT H. DAVIDSON.